July 19, 1960 L. DUPRAS 2,945,400
SELF LOCKING DIFFERENTIAL
Filed March 18, 1959

Inventor
LOUIS DUPRAS

United States Patent Office 2,945,400
Patented July 19, 1960

2,945,400

SELF LOCKING DIFFERENTIAL

Louis Dupras, 704 Champion St., Marquette, Mich.

Filed Mar. 18, 1959, Ser. No. 800,293

4 Claims. (Cl. 74—711)

This invention relates to a self locking torque transmission assembly and more particularly relates to an improved self locking differential assembly particularly adapted for transmitting torque from a drive shaft to the driving wheels in a road vehicle.

Locking differentials are quite advantageously incorporated in road vehicles, as is well known in the art, inasmuch as they provide a means for locking two opposed axle shafts together in such a manner as to permit driving torque to be transmitted equally to the two opposed shafts simultaneously.

Many manual and complex locking means have been devised for differentials to effect locking of the opposed axle shafts. However, those differentials incorporating an automatic locking means have been generally quite complex in nature and relatively expensive to produce.

I have devised a differential which automatically locks the two opposed axially aligned axle shafts with one another under preselected conditions which is of very simple design and which may be economically and relatively easily manufactured. The differential which is hereinafter disclosed in detail is of a type which is adapted to lock the two opposed axially aligned axle shafts with one another as a function of variations in the forces tending to resist rotation of the shafts and in which the locking is accomplished in a simple and novel manner.

Heretofore, differentials have been arranged so that the pinions were movable into binding engagement with the side gears in the differential case causing a binding of the gears and thereby effecting corotatable movement of the opposed axially aligned axle shafts. Such movement of the pinions was effected by means of forming sloping camways for the pinion shafts and providing a relatively complex mechanism for controllably moving the pinion shaft within the camways.

I have devised an automatically locking differential wherein the side gears are moved into binding engagement with the pinions to create a binding between the cooperating gears thereby effecting corotatable movement of the opposed axle shafts. In order to effect inward movement of the side gears into binding or locking engagement with the pinions, the side gears are threadedly mounted on the axle shafts so that when there is a momentary differential rotational speed between the side gears and their respective axle shafts, the side gears will be threadedly moved inwardly to lock with the pinions. A differential of this type is hereinafter described in detail and is, as will be apparent, of simple design but having novel features heretofore unknown in the prior art.

In view of the foregoing, it is a principal object of the present invention to provide an improved automatic locking means for a differential which is relatively simple in nature and which may be economically and readily manufactured.

Another object of the invention resides in the provision of a self locking differential wherein the side gears can be moved inwardly into binding engagement with the cooperating pinions to lock the two opposed axle shafts to permit an equal distribution of the torque from the drive shaft as a function of variances in the forces tending to oppose rotation of the locked axle shafts.

A still further and important object of the invention is the provision of an automatically locking differential of the type above described wherein the differential side gears are threadedly mounted on their respective axle shafts so that they will be moved inwardly into binding engagement with the cooperating pinions upon a differential in rotational speed between the side gears and their respective axle shafts.

These and other objects of the invention will appear from time to time as the following specification proceeds and with reference to the accompanying drawings, wherein.

Figure 2:
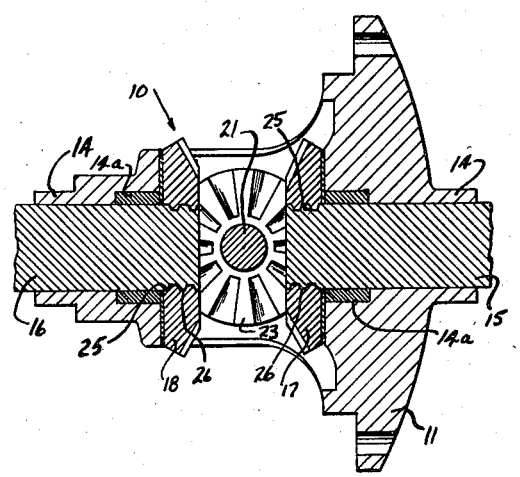
Figure 2 is a longitudinal vertical sectional view taken along lines II—II of Figure 1.
Figure 3:
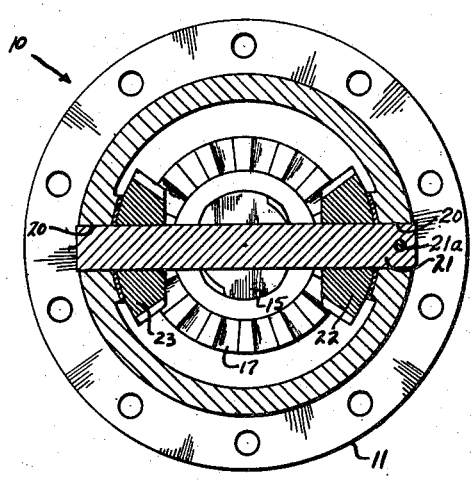
Figure 3 is a transverse vertical sectional view taken along lines III—III of Figure 1.
Figure 1:
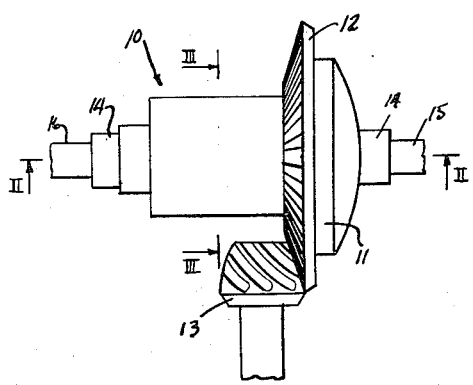
Figure 1 is a plan view of a differential assembly constructed in accordance with the principles of the present invention and showing the cooperating ring gear and drive pinion.

Referring to the drawings the differential which forms the subject of the present invention is shown as comprising generally a differential case 10 which has an annular flange 11 formed integrally therewith to which is bolted a ring gear 12. A pinion gear 13 is shown as drivingly engaging the ring gear 12 and as having a shank extending therefrom which is adapted to be secured to the drive shaft of a road vehicle or the like for corotatable movement therewith to effect rotatable movement of the ring gear 12 and the differential case 10 about an axis perpendicular to the axis of the case 10. The differential case 10, in turn, has cylindrical bearing seats 14 formed at opposite ends thereof along the rotational axis of the case which are adapted to be suitably journaled within a differential housing in a manner which is well known in the art.

Axle or output power shafts 15 and 16, respectively, are in turn journaled for rotatable movement within suitable low friction bearings 14a which are disposed within the cylindrical bearing seats 14, coaxially with the rotational axis of the differential case 10 and have a pair of side gears 17 and 18, respectively, mounted on the inner ends thereof in spaced relation from one another within the differential case 10.

Diametrically opposed apertures 20 are formed within the differential case 10 and are adapted to receive a pinion shaft 21 which, in turn, rotatably supports a pair of the usual pinion gears 22 and 23. The pinion shaft 21 is maintained properly positioned within the apertures 20 by means of a bolt 21a which extends through an aperture in the pin and which is screw-threaded into the case 10.

As is well known in the art, in the usual instance during rotatable movement of the differential case 10 the pinion gears 22 and 23 are effective to transmit rotary motion from the case 10 equally to the side gears 17 and 18. When, however, there is a differential in the resistance to rotation of the respective output shafts 15 and 16, the pinion gears 22 and 23 are operative to transmit driving torque from the differential case 10 to that shaft which is subjected to the least resistance to rotation and its respective side gear. The device which forms the subject matter of the present invention, however, is so arranged that when there is a relatively great differential in resistance to movement of the opposed axle shafts the shafts will be locked together through the train of gears within the case 10 so that driving torque will be transmitted from the case 10 equally to the two opposed axially aligned shafts.

In order to effect such a result, I have provided helical threads 25 about the walls of the respective side gears 17 and 18 which define the central openings therein and have provided cooperating threads 26 on the inner ends of the shafts 15 and 16 so that the side gears can threadedly be mounted theron. It will, of course, be understood that the coaxially aligned axle shafts 15 and 16 are so disposed within the axle housing that no longitudinal movement thereof is permitted so that when the side gears 17 or 18 move rotatably relative to their respective mounting shafts they will move axially upon relative rotation thereof with respect to their mounting shafts.

It is well known that each of a plurality of gears in a gear train must be relatively loosely fitted with one another to facilitate movement thereof. On the contrary, when a set of mating gears in a gear train, such as is found in a differential and such as is illustrated on the appended drawings, are moved into binding engagement with one another the gears tend to lock. I have incorporated this feature into the device which is herein set forth with particularity in such a manner that one or the other of the side gears may be moved inwardly within the differential case toward the other of the side gears to thus create a binding action between the pinions and the interconnected side gears to thereby lock the side gears and their respective output shafts for corotatable movement with one anoher. In this manner driving torque is transmitted from the drive shaft to the differential case and thence to each of the opposed axially aligned output shafts equally.

The operation of the device which forms the subject of the present invention is substantially as follows: Assuming that the drive shaft is rotating at a constant angular velocity the differential case will also be rotating at a constant angular velocity and assuming that the resistance to rotational movement of the opposed output shafts is equal these shafts also will be rotating at the same angular velocity as the differential case 10. If, however, the resistance to rotative movement of the shaft 16 is suddenly abruptly increased the angular velocity of the shaft 16 will tend to decrease substantially almost instantaneously. The angular momentum of the side gear 18, however, will tend momentarily to rotatably move the side gear 18 with respect to the shaft 16 on its screw threads and the gear 18 will accordingly be moved axially inwardly into binding engagement with the pinions 22 and 23 thus preventing rotatable movement of the pinions and thereby locking the entire gear train together. In this manner a greater load will be put on the power source which is effecting rotatable movement of the differential case 10 but each of the output shafts 15 and 16 will be driven at the same speed. Since the threads are formed on the shafts 15 and 16 and on their cooperating side gears 17 and 18 in the same manner (that is with either right-handed or left-handed threads) locking of the differential gear train in the above described manner may be effected regardless of the direction of rotation of the differential case 10.

The differential gear train will stay locked in this manner until the greater resistance is transferred to the opposite output shaft. Such resistance transference is, of course, quite common between the opposed axle shafts in a road vehicle and occurs whenever minor turns of the vehicle are made. As a result the gear train would not, in practice, remain locked for any very great interval but would remain locked a sufficient length of time to permit the operator of the vehicle to move the vehicle out of snow, ice, or mud and the like.

It will herein be understood that this embodiment of the invention has been used for illustrative purposes only and that various modifications and variations in the present invention may be effected without departing from the spirit and scope of the novel concepts thereof.

I claim as my invention:

1. A power transmission assembly comprising a rotatable case having a pair of output shafts journaled therein along the rotational axis of said case, a pair of side gears respectively threadedly mounted on said shafts by convolutions of the same hand and disposed within said case and spaced from one another, a pinion shaft supported within said case and extending perpendicularly of the rotational axis of said case, pinions rotatably mounted on said pinion shaft and cooperable with diametrically opposed geared peripheral portions of each of said side gears, and means for effecting rotatable movement of said case.

2. A power transmission assembly comprising a rotatable case having a pair of output shafts journaled therein along the rotational axis of said case, convolute screw threads formed on the inner ends of said shafts, a pair of side gears having complementary threads formed axially therein adapted to be respectively threadedly mounted on the inner threaded ends of said shafts by convolutions on said shafts of the same hand, a pinion shaft supported within said case and extending perpendicularly of the rotational axis of said case, pinions rotatably mounted on said pinion shaft and cooperable with diametrically opposed geared peripheral portions of each of said side gears, and means for effecting rotatable movement of said case.

3. A power transmission assembly comprising a rotatable case having a pair of output shafts journaled therein along the rotational axis of said case, convolute screw threads formed on the inner ends of said shafts, a pair of side gears having complementary threads formed axially therein respectively adapted to be threadedly mounted on the inner threaded ends of said shafts by convolutions on said shafts of the same hand, gear means interconnecting each of said side gears, and means for effecting rotatable movement of said case.

4. A power transmission assembly comprising a rotatable case having a pair of output shafts journalled therein along the rotational axis of said case, side gears respectively mounted on the inner ends of said shafts for axial movement with respect thereto, gear means interconnecting each of said side gears, means for effecting rotatable movement of said case, inclined cam drive means formed on said shafts of the same hand, and complementary cam drive means formed on said side gears and cooperable with said first-mentioned cam drive means to effect relative axial movement of said shafts and side gears respectively upon relative rotation therebetween.

References Cited in the file of this patent
UNITED STATES PATENTS

| | | |
|---|---|---|
| 1,361,895 | Nogrady | Dec. 14, 1920 |
| 1,529,804 | Nogrady | Mar. 17, 1925 |
| 1,586,861 | Taylor | June 1, 1926 |
| 2,609,711 | Wildhaber | Sept. 9, 1952 |